US012723453B2

(12) United States Patent
Jergen

(10) Patent No.: US 12,723,453 B2
(45) Date of Patent: Sep. 1, 2026

(54) DAMPING HINGE AND FUNCTIONAL ENTITY WITH A DAMPING HINGE

(71) Applicant: HAWA SLIDING SOLUTIONS AG, Mettmenstetten (CH)

(72) Inventor: Robin Jergen, Zürich (CH)

(73) Assignee: HAWA SLIDING SOLUTIONS AG, Mettmenstetten (CH)

( * ) Notice: Subject to any disclaimer, the term of this patent is extended or adjusted under 35 U.S.C. 154(b) by 0 days.

(21) Appl. No.: 18/871,582

(22) PCT Filed: Sep. 9, 2023

(86) PCT No.: PCT/EP2023/074817
§ 371 (c)(1),
(2) Date: Dec. 4, 2024

(87) PCT Pub. No.: WO2024/068244
PCT Pub. Date: Apr. 4, 2024

(65) Prior Publication Data

US 2025/0354423 A1 Nov. 20, 2025

(30) Foreign Application Priority Data

Oct. 1, 2022 (EP) .................................... 22199317

(51) Int. Cl.
*E05F 1/08* (2006.01)
*E05F 1/12* (2006.01)
*E05F 3/20* (2006.01)

(52) U.S. Cl.
CPC .............. *E05F 3/20* (2013.01); *E05F 1/1207* (2013.01); *E05Y 2201/638* (2013.01); *E05Y 2900/212* (2013.01)

(58) Field of Classification Search
CPC ....... E05D 3/02; E05D 5/0246; E05D 5/0253; E05D 5/0261; E05D 5/0269; E05D 11/00;
(Continued)

(56) References Cited

U.S. PATENT DOCUMENTS 484,628 A 10/1892 Chapin
1,084,111 A * 1/1914 Rolfson-Schmidt ......................... E05F 1/1215 16/305

(Continued)

FOREIGN PATENT DOCUMENTS

DE 20 2018 100 262 U1 1/2018
DE 20 2022 100 493 U1 2/2022
FR 3023866 A1 * 1/2016 ................ E05F 3/20

OTHER PUBLICATIONS

Nov. 23, 2023 International Search Report issued in International Patent Application No. PCT/EP2023/074817.

(Continued)

*Primary Examiner* — Chuck Y Mah
(74) *Attorney, Agent, or Firm* — Oliff PLC

(57) ABSTRACT

A damping hinge includes a first hinge lever; a second hinge lever, rotatable about a hinge axis relative to the first hinge lever and connected or connectable to a second installation part or directly to a second separating element; a hinge shaft in a first and second lever sleeve; and a damping device with an actuating element actuated by a mutual rotation of the two hinge levers. The second lever sleeve has at least one guide element; and that an actuating rod is displaceably held by the hinge shaft. The actuating rod includes a rod element and at least one track element that is connected to the rod element. The track element interacts with the guide element in such a way that the actuating rod is displaceable axially against the actuating element of the damping device when the two hinge levers are rotated relative to one another.

15 Claims, 9 Drawing Sheets

(58) Field of Classification Search
CPC ...... E05D 2003/027; E05D 2005/0253; E05D 2005/0269; E05D 2005/0263; E05D 2005/0261; E05D 2201/21; E05D 2201/264; E05D 2201/41; E05D 2201/46; E05D 2201/492; E05D 7/081; E05D 7/08; E05Y 2900/132; E05Y 2900/148; E05Y 2900/114; E05Y 2900/212; E05Y 2201/638; E05Y 2600/502; E05Y 2600/60; E05F 1/1215; E05F 1/12; E05F 1/1207; E05F 3/04; E05F 3/20; E05F 3/18; E05F 11/385; E06B 3/54; A47K 3/362; A47K 2003/367; A47F 3/12; A47F 3/125
See application file for complete search history.

(56) References Cited

U.S. PATENT DOCUMENTS

| | | | | | |
|---|---|---|---|---|---|
| 1,344,538 | A * | 6/1920 | Kaufman | E05F 1/1215 | 16/76 |
| 1,715,590 | A * | 6/1929 | Burhenne | E05F 11/00 | 292/228 |
| 2,807,043 | A * | 9/1957 | Gordon | E05F 1/1215 | 16/76 |
| 4,829,628 | A * | 5/1989 | Vuksic | E05F 3/20 | 16/DIG. 9 |
| 9,284,761 | B2 | 3/2016 | Haab et al. | | |
| 2005/0246863 | A1 | 11/2005 | Chesworth et al. | | |
| 2006/0225245 | A1* | 10/2006 | Conway | E05D 7/009 | 16/285 |
| 2010/0102494 | A1* | 4/2010 | Duc | F41H 5/22 | 267/140.12 |
| 2013/0283568 | A1* | 10/2013 | Vallance | E05F 3/20 | 16/277 |
| 2015/0292252 | A1* | 10/2015 | Svara | E05F 5/006 | 16/337 |
| 2017/0114581 | A1* | 4/2017 | Jeanrot | E05F 5/027 | |
| 2019/0040667 | A1* | 2/2019 | Feng | E05F 3/14 | |
| 2020/0141169 | A1* | 5/2020 | Talpe | E05F 3/20 | |
| 2020/0318411 | A1* | 10/2020 | Pecar | E05F 3/20 | |
| 2020/0370352 | A1* | 11/2020 | Pecar | A47K 13/12 | |
| 2022/0186539 | A1* | 6/2022 | Xue | E05F 3/04 | |
| 2022/0235594 | A1* | 7/2022 | Laws | E05F 5/02 | |

OTHER PUBLICATIONS

Nov. 23, 2023 Written Opinion issued in International Patent Application No. PCT/EP2023/074817.

* cited by examiner

DAMPING HINGE AND FUNCTIONAL ENTITY WITH A DAMPING HINGE

BACKGROUND

The invention relates to a damping hinge and a functional entity, in particular a piece of furniture or a building part, with at least one separating element, such as a door, a foldable door, or a foldable sliding door, which is connected to at least one damping hinge.

For closing functional units, such as openings of rooms or pieces of furniture, separating elements, for example foldable separating elements, such as foldable doors or foldable sliding doors, are used. Preferably, separating elements are provided, which are displaceable into a door compartment or a parking space after the opening has been released.

U.S. Pat. No. 9,284,761B2 discloses a piece of furniture with a displacement device by means of which a mounting profile connected to a foldable sliding door is displaceable within a door compartment. The foldable sliding door comprises two door elements, of which the first door element is connected at the rear by mounting hinges to a mounting profile and at the front by foldable door hinges to the rear of a second door element, which is connected at the front to a carriage, which is displaceable along a track, which comprises two track sections which are aligned perpendicularly to one another and are connected to one another by a curved section, of which a first track section extends into the door compartment and a second track section extends along the front of the piece of furniture. The mounting profile is held in vertical alignment by a supporting device and is provided on the upper side and the lower side with guide carriages which are guided in guide rails.

For closing the piece of furniture, the foldable door is extended from the door compartment and unfolded. In the closed position, the door elements are aligned planar to each other. For opening the piece of furniture, the foldable door is folded back again, after which the door elements are retracted into the door compartment in this open position, preferably aligned parallel to each other.

In the closed position, the foldable door must be kept in a planar orientation so that a folding process is not triggered automatically. After opening the foldable door from the closed position, however, it would be desirable if the folding process would be carried out automatically.

DE202018100262U1 discloses a pressure-actuated holding device that assists in both holding the foldable door in the closed position and folding the foldable door after the foldable door has been released from the closed position. This device comprises a first fitting member connected to the first door element of the foldable door and a second fitting member connected to the second door element of the foldable door. Between the first fitting member and a coupling device arranged on the second fitting member there is an ejector element which is movably connected to the first fitting member and the coupling device. A displacement of the first fitting part relative to the coupling device takes place via a force accumulator which is to be loaded manually by the user and which acts against the ejector element. When using force accumulators, which exert high forces on the hardware parts, the door elements of the foldable door are forcefully guided against each other or apart, so that the door elements can collide against each other or against a stationary part, such as a part of a cupboard, and cause impact noises.

U.S. Pat. No. 484,628A discloses a hinge having a damping device adapted to dampen movements of a door connected to the hinge. The damping device comprises a chamber in which a fluid is provided, and into which a damping piston is displaceable, which is driven by a spindle, and which comprises openings through which the fluid can flow back upon displacement of the damping piston. This hinge, which comprises a large number of device parts, is complex in design and may be susceptible to repair, as the spindle inside the damping piston can cause wear and tear and the tight sealing of the chamber into which the spindle projects may no longer be guaranteed after a long period of operation.

US20050246863A1 discloses a damping hinge with a first hinge lever comprising at a first end a first lever sleeve and at a second end a first mounting part connected to a door, and with a second hinge lever rotatable about a hinge axis relative to the first hinge lever and comprising at a first end a second lever sleeve and at a second end a second mounting part connected to a door frame. Furthermore, a hinge shaft is provided, which is arranged in the first and second lever sleeve coaxially aligned with the hinge axis, and a damping device is provided, which is operable upon a mutual rotation of the two hinge levers. The two lever sleeves comprise spiral elements directed towards each other which, when the two hinge levers rotate, act on each other and move the two hinge levers axially in relation to each other, thereby actuating the damping device and at the same time lifting the installed door, which is normally undesirable.

DE202022100493U1 discloses a damping hinge with a first hinge lever, which comprises a first lever sleeve at a first end and a first mounting part at a second end, which can be connected to a first separating element, and with a second hinge lever, which can be rotated about a hinge axis relative to the first hinge lever, and which comprises a second lever sleeve at a first end and a second mounting part at a second end, which can be connected to a second separating element. Furthermore, a hinge shaft is provided, which is arranged in the first and second lever sleeve in coaxial alignment with the hinge axis, and a damping device is provided, which can be actuated by a mutual rotation of the two hinge levers. The damping hinge further comprises a shaft core connected to the first lever sleeve, a shaft sleeve and a gas oil damper with an actuating rod connected to the second lever sleeve. The outer circumferential surface of the shaft core is provided with a spiral groove in which a pin shaft connected to the actuating rod engages. When the shaft core and the shaft sleeve rotate in relation to each other, the pin shaft is guided along the spiral groove, the actuating rod is displaced axially, and the gas oil damper is thus actuated.

This damping hinge thus comprises numerous device parts, in particular the shaft core, the shaft sleeve and the gas oil damper, which together form the hinge shaft and are arranged inside the lever sleeves. Due to the large number of device parts, the effort required to manufacture and assemble the damping hinge is correspondingly high, as are the production costs. Due to the small dimensions of the device parts that form the hinge shaft, there are delicate device components that are not capable of transmitting larger forces. In addition, wear is to be expected when larger forces are applied over a long period of operation. The spiral groove within the shaft core is relatively short, which is why the stroke of the actuating rod is also relatively small and no optimum damping effect can be achieved over this short stroke.

SUMMARY

The present invention shall therefore be based on the object of providing an improved damping hinge which is equipped with a damping device. Furthermore, a functional unit, in particular a piece of furniture or a building part, with at least one separating element shall be created, which is equipped with at least one such damping hinge.

The damping hinge shall be robust and simple in design and shall comprise as few parts as possible. On the other hand, it shall be possible to dimension the fixture parts, which shall be present in a reduced number, larger and therefore more solid.

The damping hinge shall be able to transmit higher forces and thus it shall be able to reliably dampen the movements of larger separating elements and to work without signs of wear even under higher loads over a longer period of operation.

With regard to the reduction of the device parts, it shall be possible to create the damping hinge with smaller dimensions while maintaining advantageous properties concerning damping and force transmission.

Therefore, the damping hinge shall require only little space, so that hardly any additional space is required compared to conventional hinges. The damping hinge shall therefore hardly appear visually and be optimally integrable into a functional unit with separating elements, for example into a folding door system. Further, it shall be possible to advantageously replace conventional hinges, if necessary, already installed hinges, with inventive damping hinges.

The damping hinge shall comprise an improved damping effect which shall preferably be adjustable. At least one actuating element of the damping device shall be displaceable over a longer distance so that advantageous damping properties can be realised.

The damping hinge shall be able to dampen the movement of at least one separating element connected thereto in one direction of rotation or preferably in both directions of rotation.

In preferred embodiments, the damping hinge shall also comprise a drive device which allows the separating element to be forcefully closed or the separating elements of a folding system or a foldable door to be forcefully rotated towards or away from each other. Despite the additional integration of a drive device, the damping hinge should not take up significantly more space.

By means of an inventive damping hinge or by means of several inventive damping hinges, separating elements of a functional entity, such as a foldable door or folding sliding door, should be advantageously damped during the opening process and/or during the closing process and, if necessary, also automatically driven.

This task is solved with a damping hinge according to claim 1 and a functional entity, optionally a piece of furniture or a building part, with a foldable door according to claim 15, which is equipped with at least one such damping hinge. Advantageous embodiments of the invention are defined in further claims.

The damping hinge comprises

- a first hinge lever, which comprises at a first end a first lever sleeve and at a second end a first mounting part, which is connected or connectable to a first installation part, e.g. a door frame or a hinge cup, or directly to a first separating element;
- a second hinge lever, which is rotatable about a hinge axis relative to the first hinge lever, and which comprises at a first end a second lever sleeve and at a second end a second mounting part, which is connected or connectable to a second installation part, e.g. a door frame or a hinge cup, or directly to a second separating element;
- a hinge shaft, which is arranged in the first and second lever sleeve coaxially aligned with the hinge axis; and
- a damping device with an actuating element which can be actuated by a mutual rotation of the two hinge levers.

According to the invention it is provided, that in the second lever sleeve at least one guide element is provided, which is extending spirally from one end to the other end of the second lever sleeve; and that an actuating rod is displaceably held by the hinge shaft, which actuating rod is aligned parallel or coaxially with the hinge axis and which actuating rod comprises a rod element and at least one track element that is connected to the rod element, which at least one track element interacts with the guide element in such a way that the actuating rod is displaceable axially against the actuating element of the damping device when the two hinge levers are rotated relative to one another.

With a mutual rotation of the two hinge levers in one and the other direction of rotation, the actuating rod is thus guided back and forth parallel to the hinge axis. A damping device of a damping hinge can therefore be actuated by displacing the actuating rod in one direction. In preferred embodiments, the damping hinge comprises two damping devices which along the hinge axis are aligned on opposite sides against the actuating rod and can alternately be actuated. A separating element connected to the damping hinge can therefore, depending on the embodiment of the damping hinge, be damped in movement either during the operation of opening or closing or during the operation of opening and the operation of closing, while avoiding vertical displacement of the separating element.

The inventive damping hinge is simple and robustly constructed and comprises only few device parts. The device parts, which are present in a reduced number, can be relatively large and robustly designed.

Due to the robust construction of the reduced number of device parts, the damping hinge allows the transmission of higher forces and the damping of the movements of larger and heavier separating elements.

Due to the more robust design of the fixture parts, signs of wear can be avoided even after prolonged operation of the damping hinge.

Since the actuating rod is moved parallel or coaxially to the hinge axis, only little space is required. The inventive damping hinge can therefore be realised with relatively small dimensions.

The actuating rod can also be moved over a relatively long distance so that a more advantageous damping effect can be achieved, and larger damping devices can be used.

The construction of the damping hinge is relatively simple, as the actuating rod can be slidably mounted and driven by simple means to actuate a damping device. The damping hinge can therefore be manufactured in a robust embodiment at low cost and operated for a long time without wear.

Various damping devices can be connected to the damping hinge or integrated into the damping hinge. Preferably, a commercially available damping device is provided so that the effort of integrating the damping device can be avoided and a damping device can be used that is produced in large numbers and therefore offered at low cost on the market.

Preferably, a damping device is used, which comprises a damping piston, which is displaceably mounted within a damping cylinder, which is connected to a reset element, such as a reset spring, and which is coupled or couplable to the rod-shaped actuating element, which is aligned parallel or coaxial to the actuating rod. During the displacement of the damping piston, a medium, for example a gas or a fluid, is displaced within the damping cylinder, whereby a desired damping effect is achieved. The damping piston can also be guided along an oil film. It is also possible to use magnetic damping devices.

A damping device of this type can advantageously be connected to the damping hinge and aligned parallel or coaxial to the hinge axis, which again requires little space.

In preferred embodiments, the hinge shaft comprises a bearing channel within which the actuating rod is displaceably mounted and into which the rod-shaped actuating element of the damping device preferably projects. If the actuating rod is not extending out of the bearing channel, but the rod-shaped actuating element of the damping device is guided into the bearing channel, both the actuating rod and of the rod-shaped actuating element of the damping device are guided within the bearing channel.

In preferred embodiments the actuating rod and the actuating element of the damping device are integrated in a single unit, which may have unitary dimensions or may have a first section relating to the actuating rod and a second section relating to the actuating element, which first and second sections may have different dimensions.

Preferably, the actuating rod is held axially displaceable, but not rotatable, by the hinge shaft, which is preferably form-fittingly or force-fittingly connected to the first lever sleeve. When the second lever sleeve is rotated relative to the first lever sleeve, the actuating rod is therefore not rotated, but merely axially displaced.

In a further preferred embodiment, the hinge shaft comprises a first shaft part arranged in the first lever sleeve and a second shaft part arranged in the second lever sleeve. At least one of the shaft parts is connected to a preferably sleeve-shaped receiving member, within which the damping device is held in such a way that the actuating element faces the actuating rod. The sleeve-shaped receiving member is preferably aligned parallel or coaxial to the hinge axis and thus takes up little space. Furthermore, an extension of the hinge along the hinge axis is normally not critical, as movements of the door elements are not restricted.

Preferably, the diameter of the sleeve-shaped receiving member corresponds approximately to the diameter of the lever sleeve. The receiving member is therefore preferably designed as an extension of the lever sleeve. If two damping devices are provided, a first sleeve-shaped receiving member can be connected to the first lever sleeve or with a first end piece of the hinge shaft and a second sleeve-shaped receiving member can be connected to the second lever sleeve or with a second end piece of the hinge shaft in such a way that the two receiving members are coaxially aligned and open towards the lever sleeves. The receiving member or the receiving parts can be connected form-fittingly or force-fittingly with the lever sleeve or the lever sleeves or with the hinge shaft, optionally screwed. Even in the embodiment with two damping devices, the damping hinge can therefore be realised with small dimensions. When mounting the damping hinge, it is only necessary to ensure that it is mounted at a sufficient distance from the upper or lower edge of the door elements.

In preferred embodiments, the second shaft part of the hinge shaft comprises at least one bearing gap extending outwards from the bearing channel, which extends parallel to the hinge axis and from which the at least one rod-shaped or cam-shaped track element protrudes and projects into the groove-shaped guide element of the second lever sleeve. The actuating rod can therefore be axially displaced within the hinge shaft during a rotation of the second lever sleeve without being rotated. Preferably, a bearing block is adjoining the track element, which is axially displaceable in the bearing gap of the second shaft part of the hinge shaft, but preferably held free of play with regard to a rotation.

In further preferred embodiments, the hinge shaft comprises a flange ring between the first shaft part and the second shaft part, separating the first lever sleeve and the second lever sleeve.

Preferably, at least one first coupling element, a recess or an extension is preferably provided on the flange ring or a part corresponding thereto, which form-fittingly cooperates with a second coupling element, an extension or a recess, provided on the facing side of the first lever sleeve in such a way that the first lever sleeve and the hinge shaft cannot rotate against each other. The flange ring or the part corresponding to is therefore form-fittingly and preferably backlash-free connected to the first lever sleeve with respect to a mutual rotation. In preferred embodiments, the first lever sleeve and the hinge shaft can also form a unit.

The damping device is preferably displaceable within the receiving member by means of an adjustment member, so that the beginning of the damping effect of the damping device is adjustable at a certain degree of displacement of the actuating rod and thus at a certain degree of mutual rotation of the hinge lever and door elements. The adjustment member is, for example, a threaded bolt which is rotatably held in the receiving member, which comprises at least one internal thread, so that the adjustment member is rotatable against the damping device.

Preferably, an end piece of the hinge shaft that extends from the first and/or second lever sleeve and adjoins the first or second shaft part is connected with a corresponding receiving member. Preferably, the corresponding end pieces of the hinge shaft and the receiving member(s) are provided with corresponding threaded elements so that the receiving member(s) can be screwed to the corresponding end piece(s) of the hinge shaft.

Alternatively, the first lever sleeve and/or the second lever sleeve can also be provided with connecting elements or threaded elements, which can each be connected to a receiving member.

Each receiving member is provided with a damping device, such as described above or below. Preferably, each damping device is adjustable, such that one damping device is adjustable for the opening action or the closing action or two damping devices are adjustable for the opening action and the closing action of the damping hinge.

If a damping device is only provided on one side, the exposed shaft part, typically the second shaft part, is connected to a cover. Preferably, a cover is provided which is connected to the hinge axis by a screw or which is directly screwed to the hinge axis. For example, a cover is provided that is hollow cylindrical and can be screwed onto the facing shaft part. Preferably, the cover comprises an insert that can be inserted into the bearing channel of the hinge shaft without any play. This is particularly advantageous if the facing hinge shaft only consists of fragments of two or more parts (see FIG. 6). The insert is, for example, cylindrical and coaxial to the hinge axis.

One or more guide elements are provided in the inner side of the second lever sleeve, which are preferably groove-shaped and extend offset from each other in a spiral or helical shape.

In preferred embodiments of the damping hinge, the two hinge levers are connected to each other by at least one drive spring. The damping hinge can therefore be opened or closed automatically by the drive spring. It is also possible to mount one or more drive springs, which support the opening and closing process.

It is preferably provided that the drive spring comprises at least one preferably cylindrical spring packet with several spring windings, which encloses the receiving member or the cover adjoining the first or second lever sleeve and is coupled with a first connecting piece to the first hinge lever and with a second connecting piece to the second hinge lever. If the cover is provided to hold the spring packet, it is dimensioned accordingly, for example corresponding to the length of the spring packet, and preferably firmly connected, preferably screwed, to the hinge shaft or a lever sleeve like the receiving member. Preferably, the cover is hollow cylindrical and provided with an internal thread corresponding to an external thread of an end piece of the hinge shaft.

In a particularly preferred embodiment it is provided, that the drive spring comprises a preferably cylindrical first spring packet with several spring windings, which encloses the receiving member or the cover adjoining the first lever sleeve, and is coupled with a first connecting piece to the first hinge lever and with a second connecting piece to the second hinge lever, and that the drive spring comprises a preferably cylindrical second spring packet with several spring windings, which encloses a receiving member or the cover adjoining the second lever sleeve, and is coupled with a first connecting piece to the first hinge lever and with a second connecting piece to the second hinge lever.

The corresponding first connecting pieces and/or second connecting pieces of the spring packets can be interconnected by a connection bar or can be separated from each other.

According to the invention, it is thus possible to advantageously integrate two spring packets into the damping hinge without taking up additional space. The two spring packets are capable of exerting high forces on the hinge lever, so that a separating element or separating elements connected thereto are forcefully driven after release from an end position.

The spring packets of the drive spring preferably comprise helical or thread-like windings which are in contact with each other or are at least partially spaced from each other from winding to winding, so that the spring packets can be axially compressed.

Due to the screw-like embodiment the drive spring can exert a high spring force on the hinge lever within a large rotation range of about 180°. If desired, the drive spring can also be provided with a pre-tension.

The helical or screw-like embodiment of the drive spring allows a practically coaxial alignment of the spring packets in relation to the hinge axis and thus the axis of rotation of the damping hinge, which is why only little space is taken up. Even if the coils of the spring packets are provided with a larger diameter, the result is still a very slim structure of the damping hinge.

To ensure that the spring packets are held without friction, bearing sleeves are preferably provided between the preferably sleeve-shaped receiving members and the spring packets. For example, bearing sleeves are provided that are made of plastic, which preferably comprise good sliding properties. Preferably, the bearing sleeves are made of thermoplastic material, such as POM.

The functional entity is provided with separating elements that are held by inventive damping hinges. Preferably, the functional entity comprises a foldable door or folding sliding door with separating elements or door elements that are joined with inventive damping hinges. The movements of the door element(s) are advantageously damped when moving into one end position or both end positions and preferably driven when moving out of one end position or both end positions. If several damping devices are used, they are preferably selected individually according to the desired damping characteristics.

BRIEF DESCRIPTION OF THE DRAWINGS

The invention is explained in more detail below with the reference to the drawings. Thereby shows.

DETAILED DESCRIPTION OF EMBODIMENTS

Figure 1:
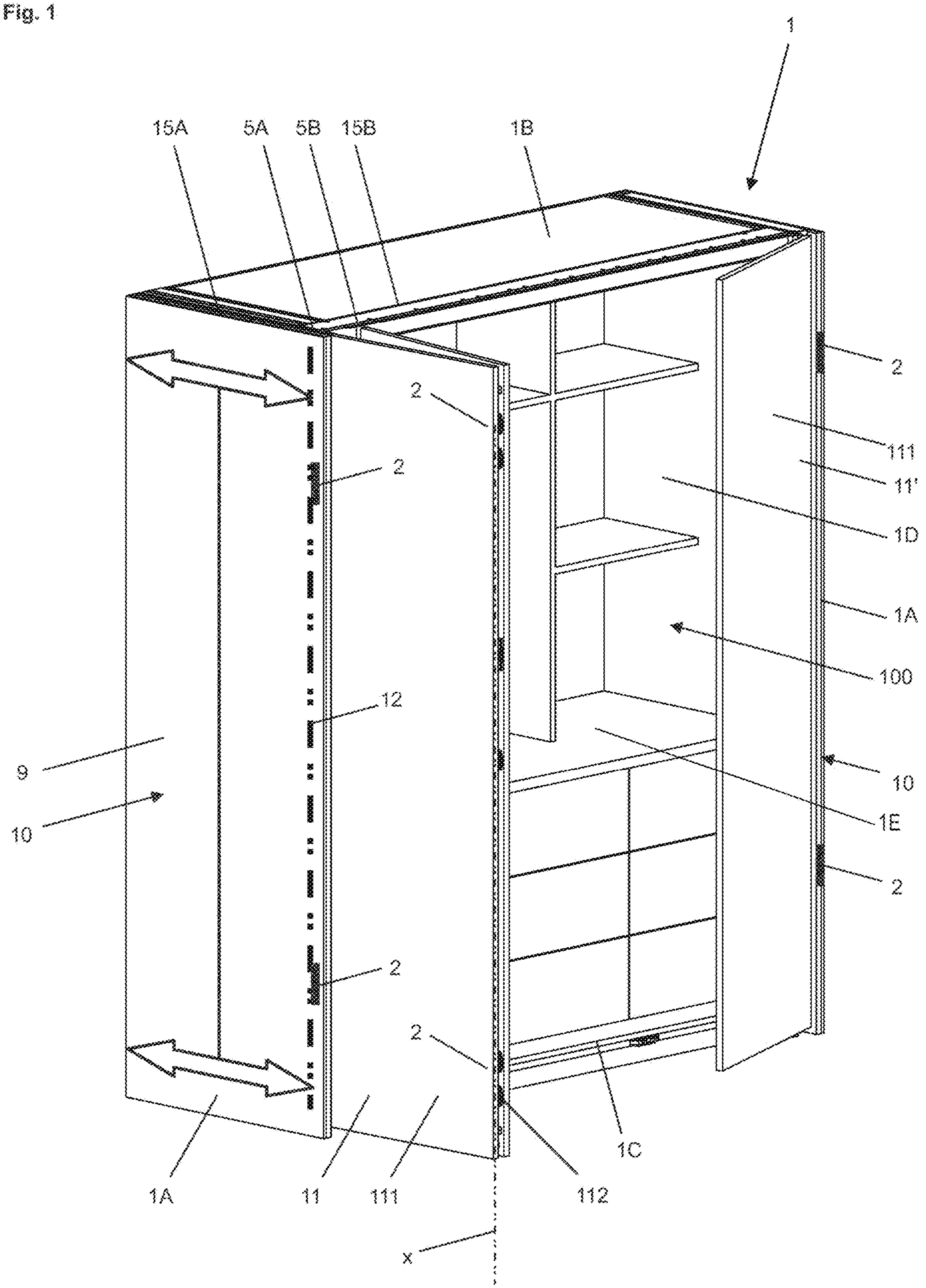
FIG. 1 an inventive functional entity 1 in the embodiment of a piece of furniture with a foldable door 11 with two door elements 111, 112, which are interconnected by inventive damping hinges 2 and can be inserted parallel to one another or folded into a first door compartment 10, and with a door 11' with only one door element 111, which is held by inventive hinges 2 and can be inserted into a second door compartment 10.

FIG. 1 shows an inventive functional entity 1 in the embodiment of a piece of furniture 1 with a foldable door 11, which can be inserted into a first door compartment 10, and with a one-part door 11', which can be inserted into a second door compartment 10.

The piece of furniture 1 preferably comprises side walls 1A, an upper board 1B, a lower board 1C, an intermediate shelf 1E and partitions 1D on both sides, which together with the side walls 1A delimit the door compartments 10.

The foldable door 11 comprises a first separating element or door element 111, which is connected on one side by mounting hinges or by inventive damping hinges 2 with a mounting profile 12, and on the other side by inventive damping hinges 2 with a second separating element or door element 112, the dimensions of which preferably correspond to the dimensions of the first door element 111.

The foldable door 11 is slightly unfolded and can either be fully folded and retracted into the door compartment 10 with the door elements 111, 112 aligned parallel to each other or fully unfolded and transferred into a closed position in which the two door elements 111, 112 are at least approximately aligned in one plane. In order for the foldable door 11 to remain held in the closed position and to be easily released from the closed position, one of the two door elements 111, 112 is preferably provided with a retaining device which, in the closed position, is opposite a stationary retaining element which is attached to the upper board 1B, for example.

In the embodiment of FIG. 1, the doors 11, 11' are preferably connected by inventive damping hinges 2 each to a mounting profile 12, which is held by a displacement device 9 and is displaceable within the associated door compartment 10. The doors 11 are aligned parallel to the side wall 1A in front of the associated door compartment 10 and can subsequently be displaced into the door compartment 10. For displacement within the door compartment 10, each mounting profile 12 may also be provided with drive means. Preferably, each mounting profile 12 is connected at the upper side to a support carriage 5A, which is displaceable along an associated support rail 15A into the door compartment 10. Also on the bottom side, each mounting profile 12 can be connected to a carriage that is guided in a support rail.

In this preferred embodiment, the second separating element 112 of the foldable door 11, the leading edge of which is connected to a guide carriage 5B, is also guided by means of a guide rail 15B which extends along the front side of the piece of furniture 1 and along a curve into the door compartment 10. The foldable door 11 is therefore held at the front side by means of the guide carriage 5B, which in the unfolded state of the foldable door 11 is displaceable along the front side of the piece of furniture 1 and in the folded state of the foldable door 11 is displaceable into the door compartment 10. The guide carriage 5B runs ahead of the second separating element 112 in the direction of movement. By using the guide carriage 5B, the foldable door 11 can be unfolded and folded with little effort.

Figure 2:
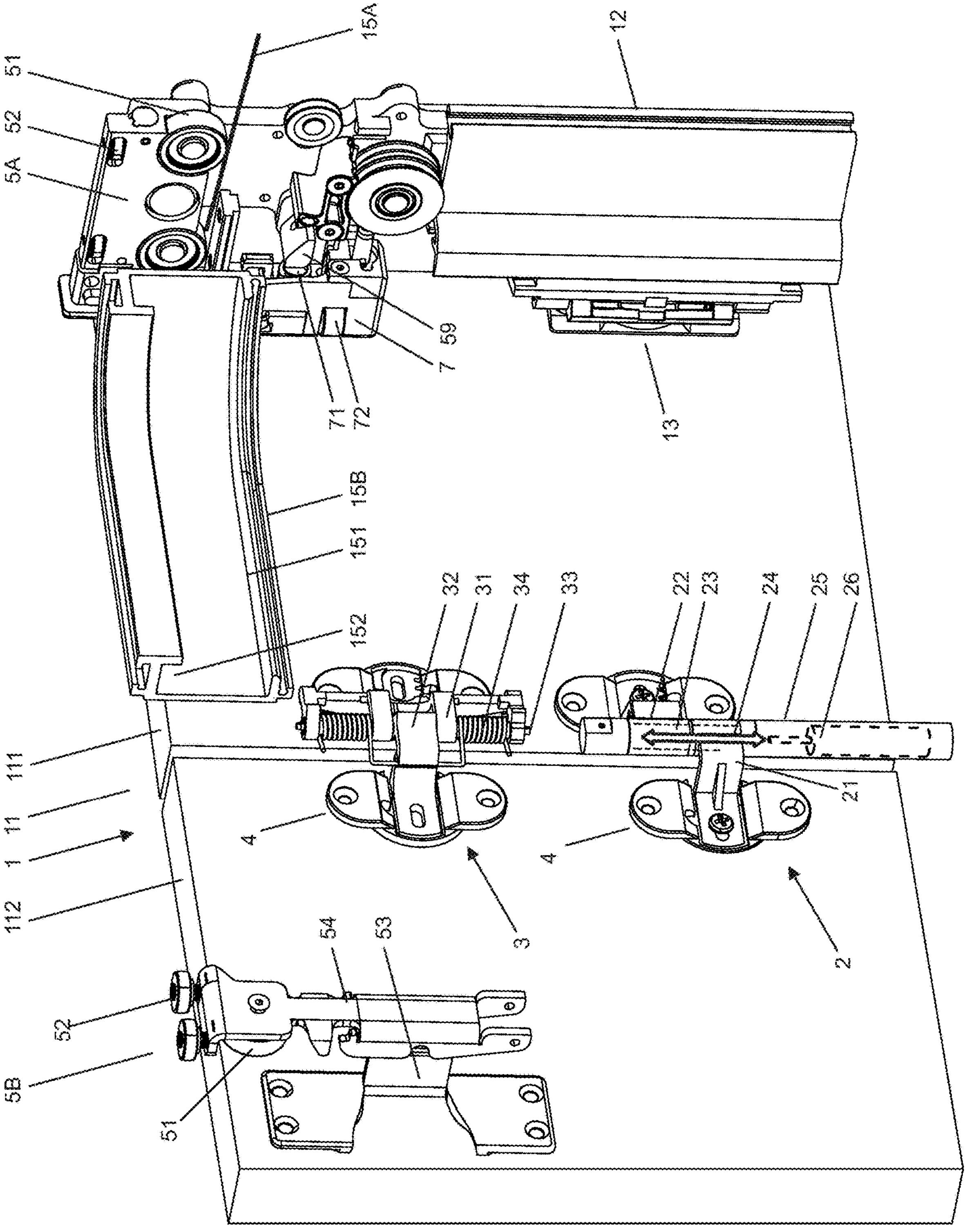
FIG. 2 the rear side of the foldable door 11 of the piece of furniture 1 of FIG. 1 with the first door element 111, which is connected at the trailing edge by mounting hinges 13 to a mounting profile 12 and at the leading edge by a damping hinge 2 according to the invention and a drive hinge 3, which comprises a drive spring 34, to a second door element 112.

FIG. 2 shows the rear side of the folding door 11 of the functional unit 1 of FIG. 1 with the first door element 111, which in this embodiment is connected at the trailing edge by mounting hinges 13 to the mounting profile 12 and at the leading edge by an inventive damping hinge 2 and a drive hinge 3 to the trailing edge of the second door element 112, on the leading edge of which the guide running gear 5B is mounted.

The inventive damping hinge 2 comprises two hinge levers 21, 22 connected to each other by a hinge shaft 23 (shown in dashed lines) and a damping device 26, which can be actuated by mutual rotation of the two hinge levers 21, 22 by means of an actuating rod 24, which is axially displaceably mounted within the hinge shaft 23 and is driven upon actuation of the damping hinge 2.

The drive hinge 3, which is the subject of an unpublished patent application, comprises two hinge levers 31, 32 interconnected by a bearing shaft 33, which are additionally interconnected by a drive spring 34.

The guide carriage 5B comprises support rollers 51 which can roll on a support element 151 of the guide rail 15B, and guide rollers 52 which are guided in a guide channel 152 of the guide rail 15B. It is shown that the guide rail 15B extends along the front side of the piece of furniture 1 and around a curve into the door compartment 10 of the piece of furniture 1. In order for the guide carriage 5B to follow this curve, it is connected to the second door element 112 by parts 53, 54 of a drive body which are hinged together.

The mounting profile 12 is connected at the upper end to a support carriage 5A, which is displaceable along a support rail 15A into the door compartment 10 by means of support rollers 51 and guide rollers 52. In FIG. 2, the support carriage 5A has been guided to a stop device 7 at the front of the door compartment 10. A stop part 59 of the support carriage 5A abuts against a buffer element 71 of the stop device 7. It is also shown that the stop device 7 is provided with deflection rollers 72 which serve for guiding the first door element 111.

In this position, which is also shown in FIG. 1, the foldable door 11 is fully extended from the door compartment 10 and can be unfolded to close the furniture opening 100 (see FIG. 1). In FIG. 2, the foldable door 11 has almost reached the closed position and can be brought into the closed position by manually pressing on the foldable door 11, preferably on the leading edge 111.

The two door elements 111, 112 are therefore automatically transferred by the drive hinge 3, for example from a closed position to an open position or from an open position to a closed position. The functional entity 1 or the foldable sliding door 11 is therefore easy to operate. To prevent the door elements 111, 112 from slamming open in the end positions, however, the inventive damping hinge 2 is provided.

In a preferred embodiment (see FIG. 9), the damping hinge 2 is additionally provided with a drive spring 8, so that in this embodiment it serves as a damping hinge and as a drive hinge. Separate damping hinges and drive hinges are therefore not required.

The damping hinge 2 can therefore be realised in various advantageous embodiments. In a first simple embodiment, the damping hinge 2 is provided for damping the movement of a connected separating element in the region of one end position. In a further preferred embodiment, the damping hinge 2 is provided for damping the movement of a connected separating element in the region of both end positions. In preferred embodiments, these damping hinges 2 are each equipped with at least one spring element 8, which comprises one preferably cylindrical spring packet or two preferably cylindrical spring packets.

Figure 3:
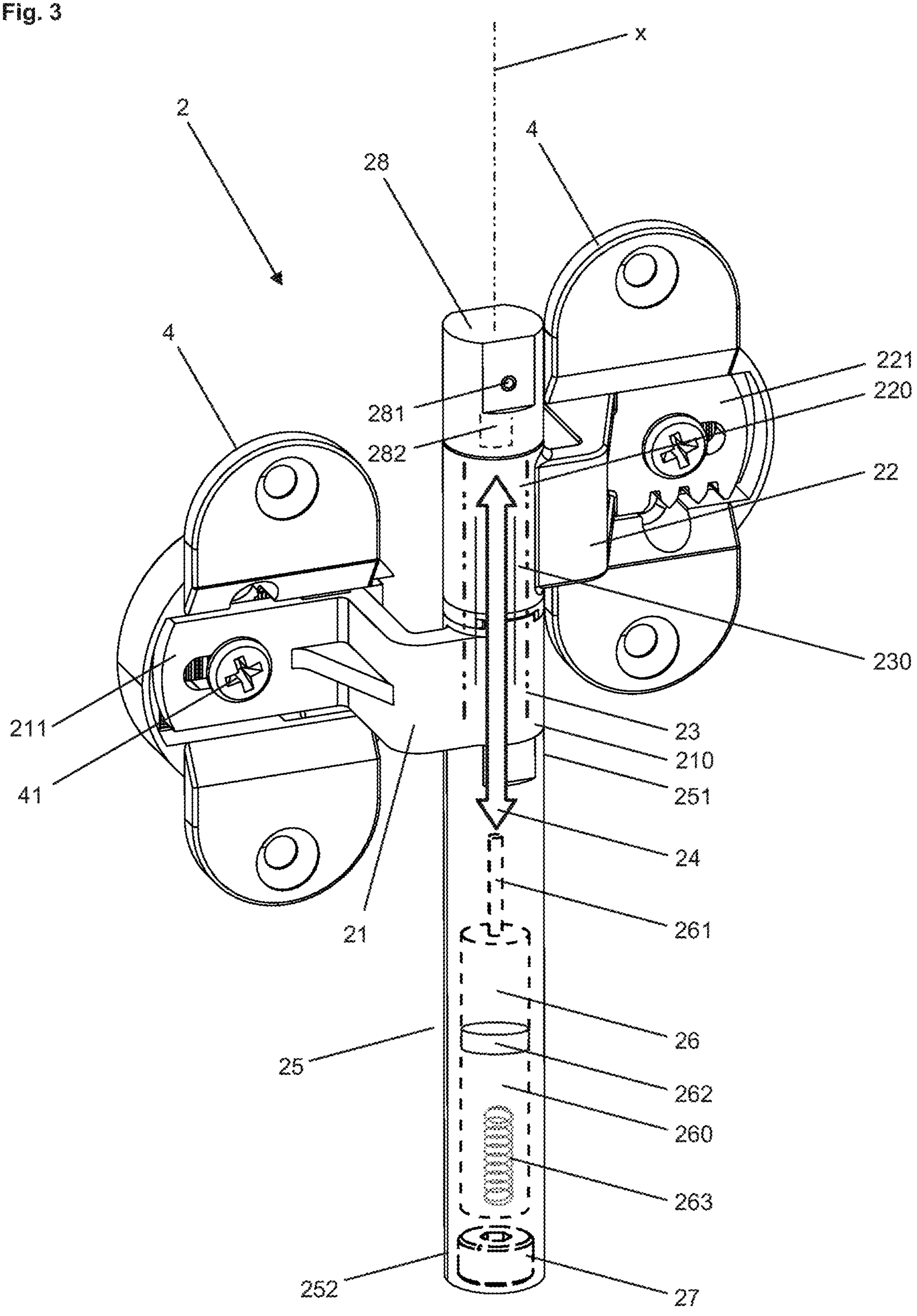
FIG. 3 the inventive damping hinge 2 of FIG. 2, which comprises two hinge levers 21, 22, each with a lever sleeve 210, 220, which are interconnected by a hinge shaft 23 (shown dotted), and with a damping device 26, which can be actuated by mutual rotation of the two hinge levers 21, 22 by means of an actuating rod 24, which is axially displaceably mounted within the hinge shaft 23 and is driven upon actuation of the damping hinge 2.

FIG. 3 shows the inventive damping hinge 2 of FIG. 2, which comprises two hinge levers 21, 22, each with a lever sleeve 210, 220, which are connected to each other by a hinge shaft 23 (shown with dashed dots, see FIG. 5), which is axially aligned with the hinge axis x of the damping hinge 2. The two hinge levers 21, 22 each comprise a mounting part 211, 221 at the end opposite the lever sleeves 210, 220, which mounting part 211, 221 can be connected to a separating element, for example by an installation part 4, such as a hinge pot. The installation part 4 is preferably connected to the respective mounting part 211, 221 by a connecting screw 41. Alternatively, the connecting pieces 211, 221 can also be connected directly to a separating element.

On the lower side of the first lever sleeve 210, a sleeve-shaped receiving member 25 is mounted, in which a damping device 26 is arranged. In this preferred embodiment, the receiving member 25 is designed as a hollow cylinder. Preferably, the receiving member 25 comprises an internal thread or an external thread 251 at the end facing the first lever sleeve 210, by means of which the receiving member 25 can be connected to the first lever sleeve 210 or to an end piece of the hinge shaft 23. At the other end, the receiving member 25 preferably comprises an internal thread 252 into which an adjustment member 27, preferably a threaded bolt, can be screwed in order to axially displace and position the damping device 26 as desired. In preferred embodiments, a continuous internal thread can also be provided in the receiving member 25.

In a preferred embodiment, the damping device 26; 26A, 26B comprises, within the associated receiving member 25; 25A, 25B (see FIG. 3 and FIG. 8*a*), a device part 260 having an external thread engaging an internal thread of the receiving member 25; 25A, 25B, such that the damping device 26; 26A, 26B is rotatably and axially displaceable. The damping device 26; 26A, 26B can therefore be rotated to a desired position and subsequently preferably fixed, for example, by means of the adjustment member 27, which is rotated against the damping device 26; 26A, 26B. The device part with the external thread is preferably the damping cylinder 260.

In all embodiments of the inventive damping hinge 2 described the damping device 26; 26A, 26B can preferably be moved to a specific position in order to be contacted by an actuating rod 24. The contacting of the damping device 26; 26A, 26B can take place only in the end region or over the entire range of rotation of the hinge lever 21, 22. If two damping devices 26A, 26B are provided, as in the embodiment of FIG. 8*a*, the damping effect can be selectively adjusted by the actuating rod 24 to the respective contacting of the damping devices 26A, 26B, so that a desired damping effect is reached in each end position of the damping hinge 2. The damping effect can occur over the entire range of rotation of the hinge lever 21, 22 or only before an end position is reached.

At the upper side of the second lever sleeve 220, a cover 28 is placed on the hinge shaft 23 and connected to it by a fixing screw 281. In preferred embodiments, the cover 28 is cylindrical in shape and is provided with an internal thread by means of which the cover 28 can be screwed onto the upper end piece of the hinge shaft 23. Alternatively or additionally, the cover 28 comprises a centre bolt 282, which can be inserted or screwed into a bore or bearing channel in the hinge shaft 23. Alternatively, the cover 28 can also be connected to the second lever sleeve 220.

An actuating rod 24 is held axially displaceable by the hinge shaft 23 and is driven by the second lever sleeve 220. Preferably, the actuating rod 24 is displaceably mounted in a bearing channel 230 of the hinge shaft 23. During the axial displacement, the actuating rod 24 can cooperate with an actuating element 261 of the damping device 26, which is held in the receiving member 25.

The damping device 26 may be of any configuration. Preferably, the damping device 26 comprises a damping cylinder 260 and a damping piston 262 which is connected to the actuating element 261 and which is displaceable within the damping cylinder 260, for example to dislodge a gaseous or liquid medium or to slide along an oil film. The movements of the damping piston 262 are therefore damped by the medium to be displaced or by the oil film, which is why the movement of the actuating rod 24 and thus the mutual rotation of the hinge lever 21, 22 is also damped. The damping device 26 also comprises a reset element 263, such as a reset spring, by means of which the damping piston 262 is always returned. If the actuating rod 24 is firmly connected to the actuating element 261 of the damping device 26, the return of the damping piston 262 can also be effected by the actuating rod 24.

In preferred embodiments the actuating rod 24 and the actuating element 261 are made in one piece or are loosely or firmly coupled for example by at least one threaded element.

Figure 4A:
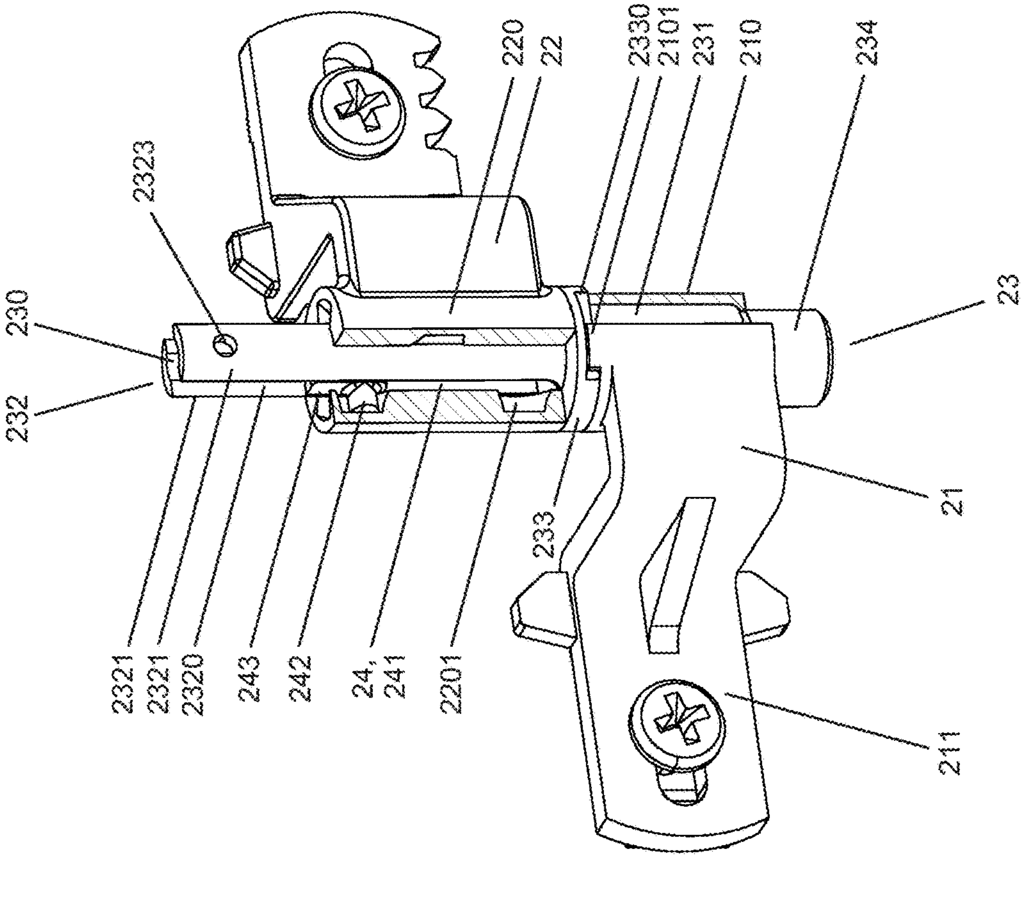
FIG. 4*a* the two hinge levers 21, 22 interconnected by the hinge shaft 23 and the actuating rod 24 of the damping hinge 2 of FIG. 3 slidably mounted in a bearing channel 230 of the hinge shaft 23, shown each with a quarter section through the first and second lever sleeve 210, 220.

FIG. 4*a* shows the two hinge levers 21, 22 connected to each other by the hinge shaft 23 and the actuating rod 24 of the damping hinge 2 of FIG. 3 slidably mounted in a bearing channel 230 of the hinge shaft 23.

Through a quarter section through each of the first and second lever sleeves 210, 220, four essential parts of the hinge shaft 23 are at least partially disclosed. The hinge shaft 23 comprises a first shaft part 231 held in the first lever sleeve 210 and a second shaft part 232 held in the second lever sleeve 220, which projects upwards beyond the second lever sleeve 220. The second shaft part 232 is divided by an axial section into two equal shaft segments 2321, which are opposite each other and which are separated from each other centrally by the bearing channel 230 and on both sides by bearing gaps 2320. On the upper side of at least one of the shaft parts 2321 a threaded hole 2323 is provided, which serves to receive a fixing screw 281, by means of which the cover 28 (see FIG. 3) can be fastened.

Between the first and the second shaft parts 231, 232, the hinge shaft 23 comprises a flange ring 233 extending outwardly between the two lever sleeves 210, 220 and preferably having the same outer diameter as the two lever sleeves 210, 220. Facing the first lever sleeve 210, the flange ring 233 comprises a first coupling element 2330 which form-fittingly cooperates with a second coupling element 2101 provided on the upper side of the first lever sleeve 210. The first coupling element 2330 is provided as a recess in flange ring 233 and the second coupling element 2101 is provided as an extension on the upper side of first lever sleeve 210. The two coupling elements 2330, 2101 engage form-fittingly and preferably without play, so that the first hinge lever 21 and the hinge shaft 23 cannot rotate against each other. Furthermore, the hinge shaft 23 comprises a connecting part 234 on the underside, which projects downwards from the underside of the first lever sleeve 210 and can be connected, preferably screwed, to the receiving member 25 of FIG. 3. The outer diameter of the receiving member 25 and preferably of the cap 28 preferably corresponds to the outer diameter of the lever sleeves 210, 220, which is why the lever sleeves 210, 220 and the receiving member 25 form a uniform cylinder with small dimensions. The damping hinge 2 can therefore advantageously be used as a replacement for conventional hinges.

Figure 7:
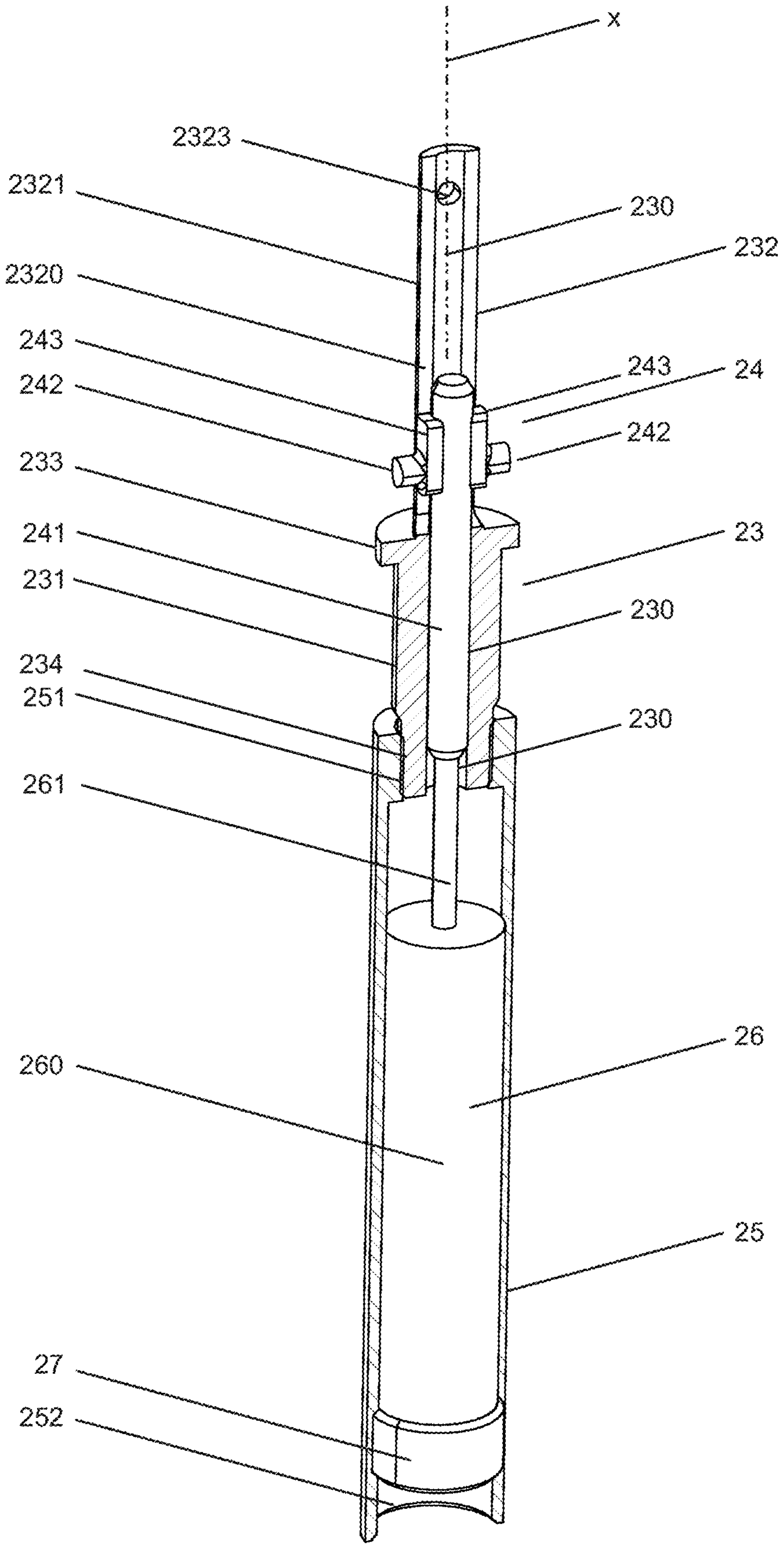
FIG. 7 in a longitudinal section the hinge shaft 23 of FIG. 6 with the cylindrical receiving member 25 connected thereto, in which the damping device 26 is held by means of the adjustment member 27, and with the actuating rod 24, which is slidably mounted in the bearing channel 230 of the hinge shaft 23.

FIG. 7 shows that the hinge shaft 23 is provided with a bearing channel 230 which extends coaxially to the hinge axis x, preferably through the entire hinge shaft 23. Within the bearing channel 230, a rod element 241 of an actuating rod 24 is slidably mounted. The rod element 241 comprises cam-shaped track elements 242 on both sides, to each of which a bearing block 243 is adjoined.

FIG. 4*a* shows that each of the track elements 242 is guided in a guide element 2201 provided on the inner side or inner wall of the second lever sleeve 220. The guide elements 2201 are grooved and offset from each other in a spiral or helical pattern on the inside of the second lever sleeve 220, so that when the second lever sleeve 220 is rotated relative to the first lever sleeve 210 or vice versa, the track elements 242 follow the track shaped guide elements 2201 downwards or upwards, thereby displacing the actuating rod 24 relative to the damping device 26 and actuating it.

The track elements 242 protrude from a bearing block 243, which is held in the associated bearing gap 2320 between the shaft segments 2321 of the second shaft part 232 of the hinge shaft 23. The track elements 242 can therefore only be moved parallel to the associated bearing gap 2320 and thus only parallel to the hinge axis x when the second lever sleeve 220 is rotated.

Figure 4B:
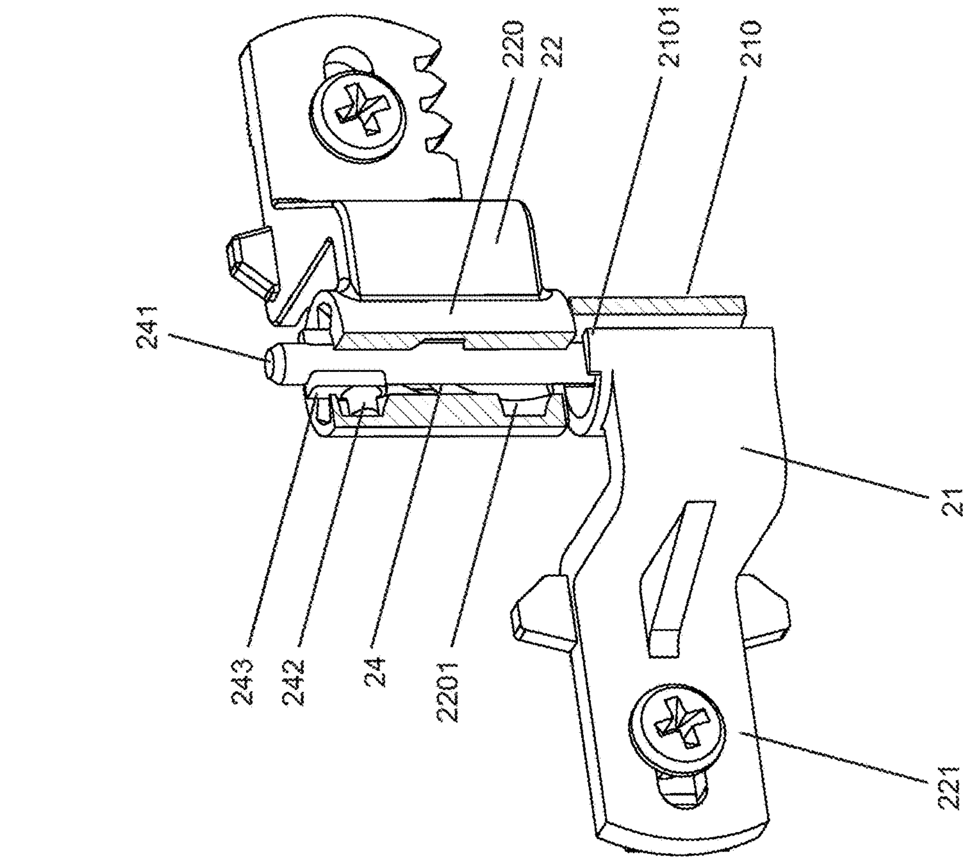
FIG. 4*b* the two hinge levers 21, 22 and the actuating rod 24 of the damping hinge 2 of FIG. 4*b* without the hinge shaft 23.

FIG. 4*b* shows the two hinge levers 21, 22 and the actuating rod 24 of the damping hinge 2 of FIG. 4*a* without the hinge shaft 23. In this illustration the rod element 241, the track element 242 and the adjoining bearing block 243 of the actuating rod 24 are clearly visible.

Figure 5:
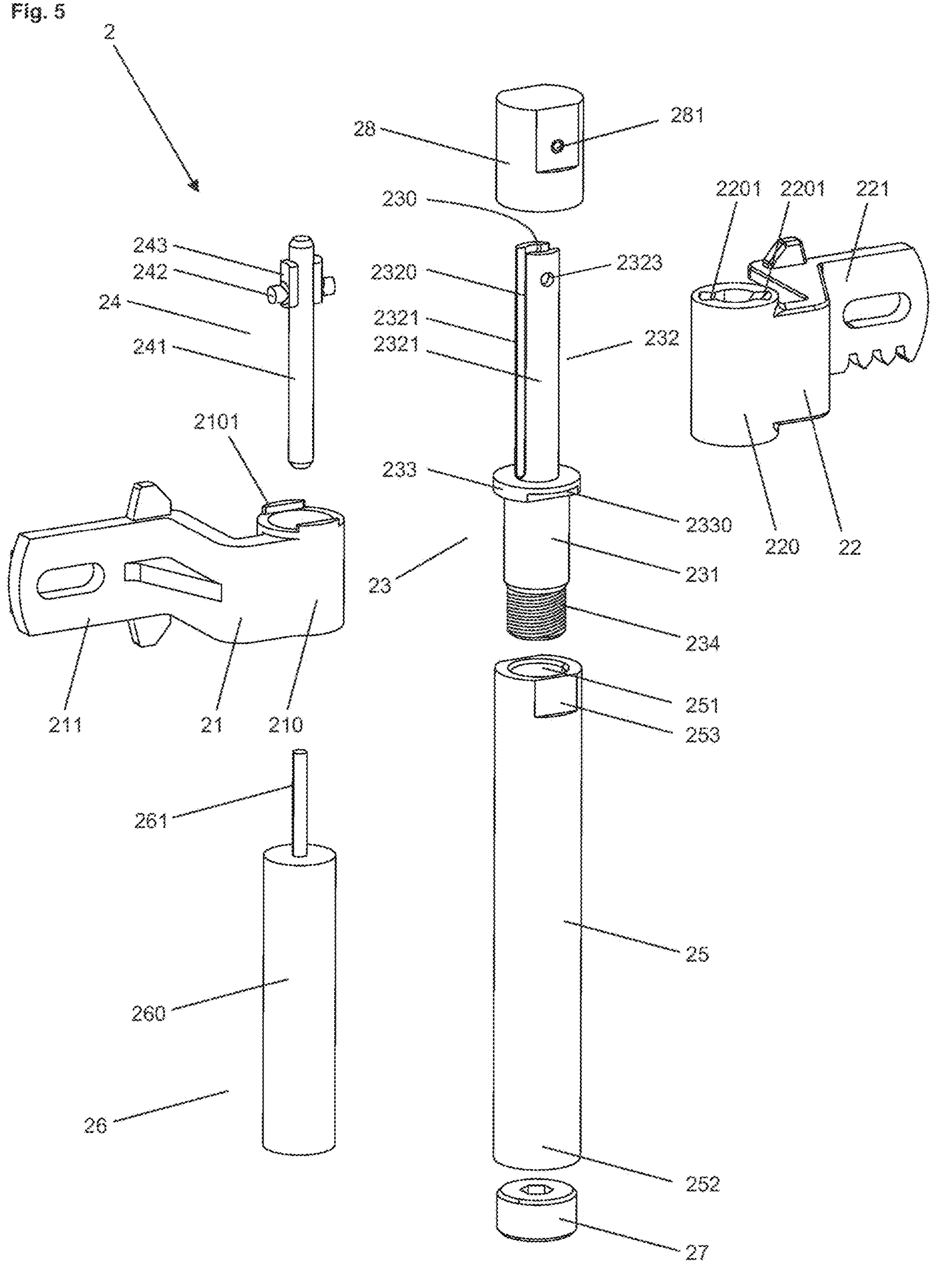
FIG. 5 in exploded view the two hinge levers 21, 22, the hinge shaft 23, and the actuating rod 24 of the damping hinge 2 of FIG. 3, with a cover 28 and with a sleeve-shaped receiving member 25, in which on the one hand a damping device 26 and on the other hand an adjustment member 27, by means of which the position of the damping device 26 in the receiving member 25 can be adjusted, are inserted.

FIG. 5 shows an exploded view of the two separate hinge levers 21, 22, the hinge shaft 23, and the actuating rod 24 of the damping hinge 2 of FIG. 3, with the cover 28 and the sleeve-shaped receiving member 25, into which on the one hand the damping device 26 and on the other hand an adjustment member 27 are inserted, by means of which the position of the damping device 26 in the receiving member 25 can be adjusted. It is shown that the connecting part 234 comprises a thread and can thus be screwed to the receiving member 25.

Figure 6:
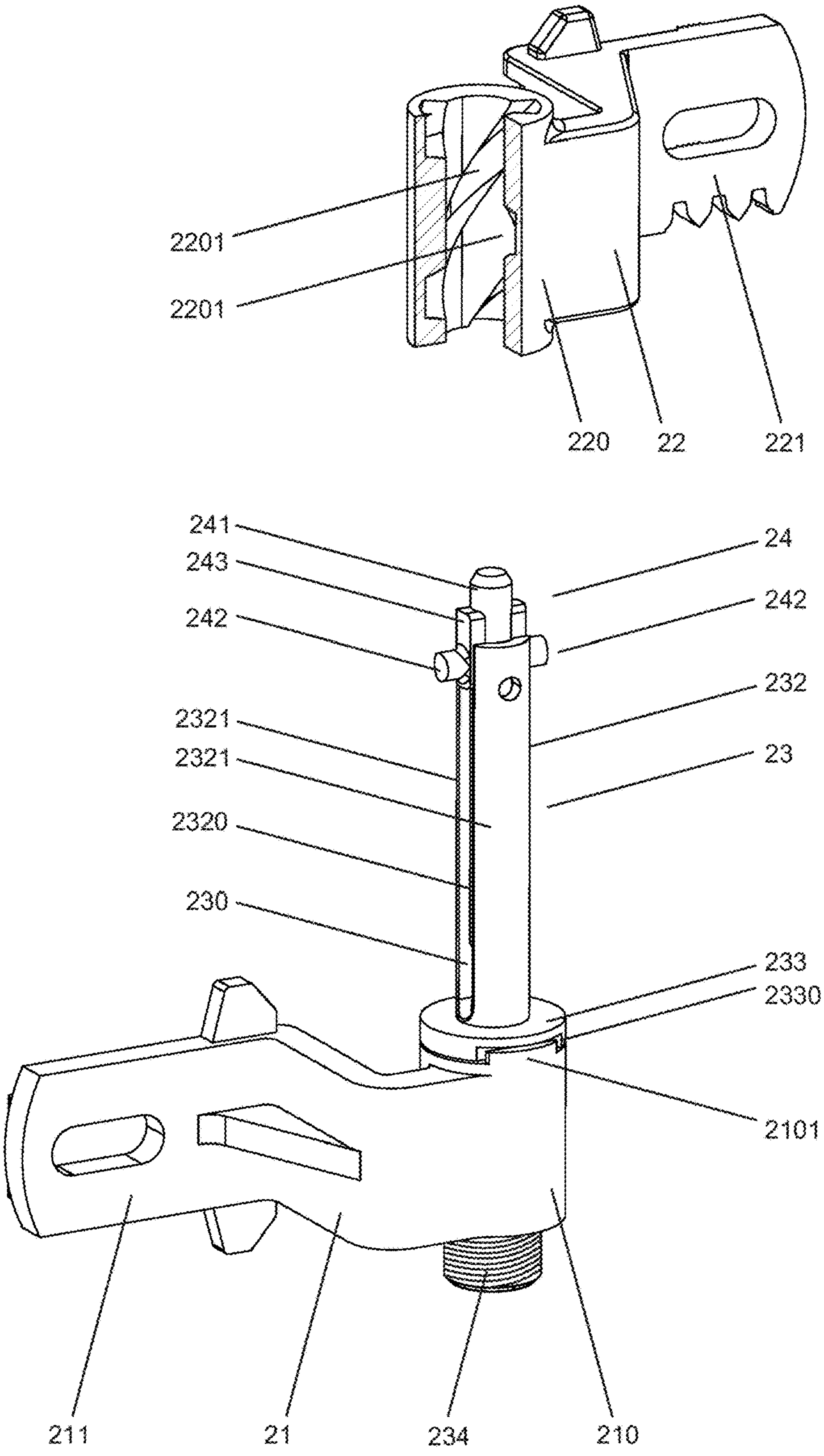
FIG. 6 the two separated hinge levers 21, 22 of FIG. 5, the hinge shaft 23 inserted in the first lever sleeve 210 and the actuating rod 24 of the damping hinge 2 slidably mounted in a bearing channel 230 of the hinge shaft 23.

FIG. 6 shows the two separate hinge levers 21, 22, the hinge shaft 23, which is inserted into the first lever sleeve 210, and the actuating rod 24 of the damping hinge 2 of FIG. 5, which is displaceably mounted in a bearing channel 230 of the hinge shaft 23. In this illustration, the groove-shaped and spirally running guide elements 2201, which are provided on the inside of the second lever sleeve 220, are visible. Furthermore, it is visible that the hinge shaft 23 is form-fittingly coupled to the first lever sleeve 210 by the coupling elements 2330, 2101, which prevents mutual rotation.

FIG. 7 shows a longitudinal section of the hinge shaft 23 with the receiving member 25 connected to it, in which the damping device 26 is held by means of the adjustment member 27, and with the actuating rod 24, which is slidably mounted in the bearing channel 230 of the hinge shaft 23. The sectioned parts are shown hatched. Only one of the shaft segments 2321 of the second shaft part 232 of the hinge shaft 23 is shown, which is not affected by the longitudinal section.

It is shown that the rod element 241 of the actuating rod 24 is guided in the bearing channel 230 of the hinge shaft 23, and rests against the actuating element 261 of the damping device 26, which is also rod-shaped and also projects into the bearing channel 230 of the hinge shaft 23 in the region of the first lever sleeve 210 and is aligned coaxially with the rod element 241. The actuating element 261 with the piston 262 (see FIG. 3) is preferably supported by a spring 263 and is pressed towards the rod element 241.

Figure 8A:
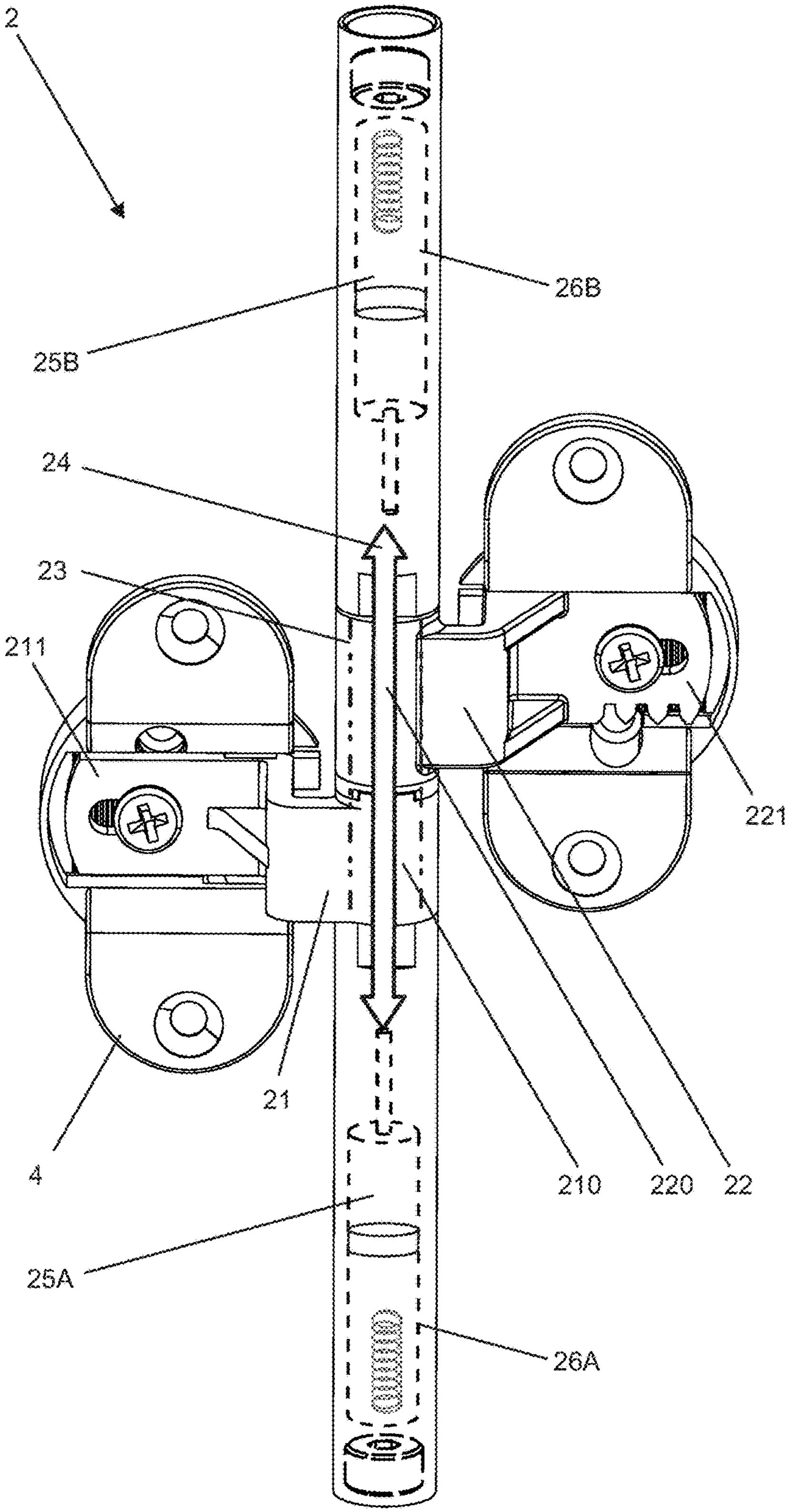
FIG. 8*a* the inventive damping hinge 2 of FIG. 3 with an actuating rod 24, which on both sides each can alternately actuate a damping device 26A, 26B, which are arranged in receiving members 25A, 25B, which are connected to the lever sleeves 210, 220 or to end pieces of the hinge shaft 23.

FIG. 8*a* shows the inventive damping hinge 2 of FIG. 3 with an actuating rod 24, which can alternately actuate a damping device 26A, 26B on each side, which are arranged in receiving members 25A, 25B. The receiving members 25A, 25B are connected to the lever sleeves 210, 220 or to end pieces of the hinge shaft 23. Instead of the cover 28, a second receiving member 25B is thus provided on the upper side of the second lever sleeve 220, into which the rod element 241 of the actuating rod 24 can extend. When the hinge 2 is opened, the actuating rod 24 is guided upwards against the damping device 26B, for example, so that the actuating rod 24 is guided downwards against the damping device 26A when the hinge 2 is closed.

Figure 8B:
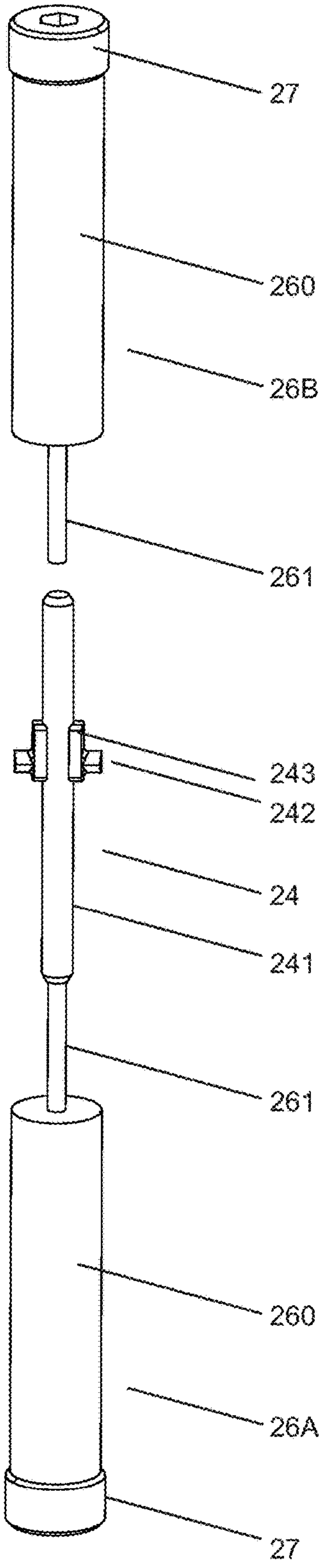
FIG. 8*b* the damping devices 26A, 26B and the actuating rod 24 extracted from the damping hinge 2 of FIG. 8*a*.

FIG. 8*b* shows the damping devices 26A, 26B taken from the damping hinge 2 of FIG. 8*a* and the actuating rod 24, the rod element 241 of which has been extended upwards so that when the actuating rod 24 is moved upwards, the upper damping device 26B can be actuated.

Figure 9:
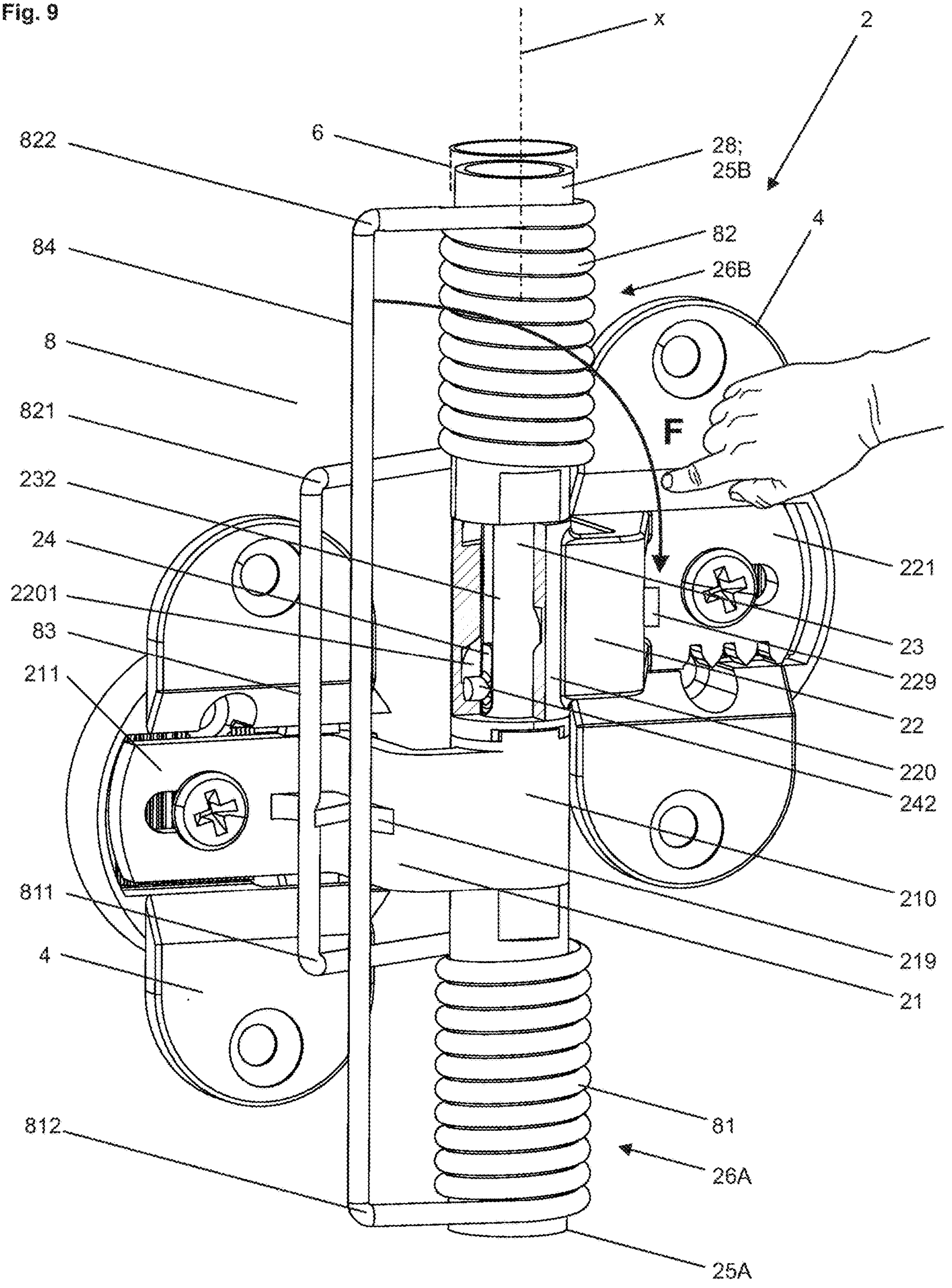
FIG. 9 the damping hinge 2 of FIG. 8*a* equipped with a drive spring 8.

FIG. 9 shows the damping hinge 2 of FIG. 3 equipped with a drive spring 8 with an extended cover 28 and only one damping device 26 or the damping hinge 2 of FIG. 8*a* equipped with a drive spring 8 with two receiving members 25 and two damping devices 26A, 26B.

The drive spring 8 comprises a first cylindrical spring packet 81 enclosing the lower receiving member 25A and a second cylindrical spring packet 82 enclosing the upper receiving member 25B or the cover 28. The first connecting pieces 811, 821 of the spring packets 81, 82 are connected to the first hinge lever 21 and the second connecting pieces 812, 822 of the spring packets 81, 82 are connected to the second hinge lever 22. In this preferred embodiment, the first connecting pieces 811, 821 are connected to each other by a first connection bar 83, which is hooked into a retaining element 219 on the first hinge lever 21. The second connecting pieces 812, 822 are interconnected by a second connection bar 84, which can be hooked into a retaining element 229 on the second hinge lever 22.

The drive spring 8 is designed to be preferably powerful. Nevertheless, the manual operation or tensioning of the drive spring 8 can be easily performed by means of one of the connection bars 84. The hand movement by means of which the second connection bar 84 is hooked onto the second hinge lever 22 is symbolised by an arrow.

In the embodiment of the retaining elements 219, 229 as latching elements, the coupling of the connecting bar 84 can preferably also be advantageously accomplished by turning the hinge levers 21, 22 or the separating elements 111, 112 connected thereto in opposite directions. In this case, the second hinge lever 22 is turned clockwise until the second connection bar 84 is guided over the second retaining element 229 and snaps into place.

In order to ensure that the spring packets 81, 82 are advantageously supported, plastic bearing sleeves 6 are preferably inserted between the receiving members 25A, 25B and, if applicable, the cover 28 on the one hand and the spring packets 81, 82 on the other.

The inventive damping hinge 2 thus allows two interconnected separating elements 111, 112 to be held rotatably against each other and their movements to be damped either during closing or opening in the embodiment of FIG. 3 or both during closing and opening in the embodiment of FIG. 8*a*. The damping can take place only in the end areas or over the entire range of rotation of the damping hinge 2. As described, the damping device 26 or damping devices 26A, 26B can preferably be adjusted individually.

As described, the damping hinge 2 is preferably equipped with at least one drive spring 8, so that an additional drive hinge 3, as shown in FIG. 2, can be avoided.

LIST OF REFERENCES

1 functional entity, piece of furniture, e.g. wardrobe
1A side walls
1B upper board
1C lower board
1D separation wall
10 first or second door compartment 10 or parking space
100 interior of the functional entity 1
11 foldable door
111 first door element
112 second door element
11' one-part Tür
12 mounting profile
13 mounting hinges
15A support rail for the support carriage 5A
15B guide rail for the guide carriage 5B
151 support element
152 guide channel
2 damping hinge
21 first hinge lever
210 first lever sleeve
2101 second coupling element, extension or recess
211 first mounting part
219 first retaining element, preferably latching element
22 second hinge lever
220 second lever sleeve
2201 guide element, e.g. spiral grooves
221 second mounting part
229 second retaining element, preferably latching element
23 hinge shaft
230 bearing channel
231 first shaft part
232 second shaft part
2320 bearing gap
2321 shaft segments of the second shaft part
2323 threaded hole
233 flange ring
2330 first coupling element, extension or recess
234 connecting part
24 actuating rod
241 rod element
242 track element
243 bearing block
25 receiving member, preferably hollow cylindrical
251 first connecting part, internal thread
252 second connecting part, internal thread
253 coupling member for coupling a tool
26 damping device
260 damping cylinder
261 actuating element
262 damping piston
263 reset element, reset spring
27 adjustment member, threaded bolt
28 cover
281 fixing screw
282 insert, centre bolt
3 drive hinge
31 first hinge lever
32 second hinge lever
33 bearing shaft
34 drive spring of the drive hinge
4 installation part, hinge pot
41 connecting screw
5A support carriage
5B guide carriage
51 support rollers
52 guide rollers
53 first carriage body part
54 second carriage body part
6 bearing sleeve
8 drive spring of the damping hinge
81 first spring packet
811 first connecting piece of the first spring packet 81
812 second connecting piece of the first spring packet 81
82 second spring packet
821 first connecting piece of the second spring packet 82
822 second connecting piece of the second spring packet 82
83, 84 first and second connection bars
9 displacement device
x hinge axis

The invention claimed is:

1. A damping hinge, comprising:

a first hinge lever, which comprises at a first end a first lever sleeve and at a second end a first mounting part, which is connected or connectable to a first installation part or directly to a first separating element;

a second hinge lever, which is rotatable about a hinge axis relative to the first hinge lever, and which comprises at a first end a second lever sleeve and at a second end a second mounting part, which is connected or connectable to a second installation part or directly to a second separating element;

a hinge shaft, which is arranged in the first lever sleeve and the second lever sleeve coaxially aligned with the hinge axis; and a damping device with an actuating element which can be actuated by a mutual rotation of the two hinge levers, wherein, the hinge shaft is traversed by a bearing channel;

in the second lever sleeve at least one guide element is provided, which is extending spirally from one end to the other end of the second lever sleeve; and an actuating rod is displaceably held within the bearing channel of the hinge shaft, which actuating rod is aligned parallel or coaxially with the hinge axis and which actuating rod comprises a rod element and at least one track element that is connected to the rod element, which at least one track element interacts with the guide element in such a way that the actuating rod is displaceable axially against the actuating element of the damping device when the two hinge levers are rotated relative to one another.

2. The damping hinge according to claim 1, wherein the damping device comprises a damping cylinder and a damping piston, which is slidably mounted within the damping cylinder, which is connected to the actuating element that has a rod shape which is oriented parallel or coaxially to the rod element of the actuating rod, and which is connected to a reset element.

3. The damping hinge according to claim 1, wherein the actuating element of the damping device that has a rod shape projects into the bearing channel.

4. The damping hinge according to claim 1, wherein the actuating rod is held axially displaceable, but not rotatable, by the hinge shaft, which is connected to the first lever sleeve, or the actuating rod is held axially displaceable, but not rotatable, by the hinge shaft, which is form-fittingly or force-fittingly connected to the first lever sleeve.

5. The damping hinge according to claim 1, wherein the hinge shaft comprises a first shaft part arranged in the first lever sleeve and a second shaft part arranged in the second lever sleeve, wherein at least one of the shaft parts is connected to a receiving member in which the damping device is held in such a way that the actuating element faces the actuating rod.

6. The damping hinge according to claim 5, wherein the second shaft part, which is formed integrally or comprises two shaft segments separated from each other along the bearing channel, comprises at least one bearing gap which extends parallel to the hinge axis and from which the track element that has a rod shape or a cam shape protrudes and projects into the guide element that has a groove shape of the second lever sleeve.

7. The damping hinge according to claim 6, wherein, the actuating rod is connected on one side to the at least one track element which is adjoined by a bearing block which is held in an axially displaceable manner in the at least one bearing gap; or the second shaft part comprises two shaft segments which are separated from one another along the bearing channel and which, on opposite sides of the bearing channel, each delimit a bearing gap extending outwards from the bearing channel, and the actuating rod is connected on opposite sides each to one of the track elements which are adjoined by a bearing block held axially displaceably in the associated bearing gap.

8. The damping hinge according to claim 1, wherein the hinge shaft comprises between a first shaft part and a second shaft part a flange ring which separates the first lever sleeve and the second lever sleeve from each other and which comprises at least one first coupling element which form-fittingly cooperates with a second coupling element provided at a side of the first lever sleeve, which is facing the flange ring, in such a way that the first lever sleeve and the hinge shaft are not rotatable against each other.

9. The damping hinge according to claim 5, wherein a connecting piece of the hinge shaft is connected to an associated receiving member in which an associated damping device is arranged and that the hinge shaft is connected to a cover by means of a screw connection or a screw; or a first connecting piece of the hinge shaft leading out of the first lever sleeve is connected to a first receiving member in which a first damping device is arranged; and that a second connecting piece of the hinge shaft leading out of the second lever sleeve is connected to a second receiving member in which a second damping device is arranged, wherein the first and the second damping device can alternately be actuated by opening and closing the damping hinge.

10. The damping hinge according to claim 1, wherein the damping device is held within an associated receiving member axially displaceably and is adjustable by providing within the associated receiving member an adjustment member which is rotatable or displaceable relative to the damping device, or is adjustable in that the damping device comprises an external thread on a device part which engages in an internal thread of the associated receiving member.

11. The damping hinge according to claim 1, wherein inside the second lever sleeve a groove-shaped guide element, in which the at least one track element of the actuating rod is guided, extends in a spiral or helical shape, or the actuating rod comprises a rod element with two track elements, inside the second lever sleeve two groove-shaped guide elements, in each of which one of the two track elements of the actuating rod is guided, extend offset from one another in a spiral or helical manner.

12. The damping hinge according to claim 1, wherein the two hinge levers are connected to each other by at least one drive spring.

13. The damping hinge according to claim 12, wherein the drive spring comprises at least one first spring packet with several spring windings, which encloses the receiving member adjoining the first or second lever sleeve and which is coupled by a first connecting piece to the first hinge lever and by a second connecting piece to the second hinge lever, or the drive spring comprises a first spring packet with several spring windings, which encloses a first receiving member adjoining the first lever sleeve and is coupled with a first connecting piece to the first hinge lever and with a second connecting piece to the second hinge lever, and the drive spring comprises a second spring packet with a plurality of spring windings, which encloses a second receiving member adjoining the second lever sleeve and which is coupled by a first connecting piece to the first hinge lever and by a second connecting piece to the second hinge lever, wherein the first connecting pieces and the second connecting pieces of the two spring packets are each connected to each other by a first or second connection bar.

14. The damping hinge according to claim 13, wherein a bearing sleeve is arranged between each spring packet and the associated receiving member.

15. A functional entity in the embodiment of a piece of furniture or in the embodiment of a building part, comprising a separating element which is connected to at least one damping hinge according to claim 1 or comprising a plurality of separating elements which are connected in pairs to the at least one damping hinge.

* * * * *